(12) United States Patent
Takeda et al.

(10) Patent No.: US 6,192,710 B1
(45) Date of Patent: Feb. 27, 2001

(54) METHOD AND APPARATUS FOR BENDING SHEET GLASS

(75) Inventors: Takashi Takeda; Nozomi Ohtsubo, both of Aikawa-machi (JP)

(73) Assignee: Asahi Glass Company Ltd., Tokyo (JP)

(*) Notice: Subject to any disclaimer, the term of this patent is extended or adjusted under 35 U.S.C. 154(b) by 0 days.

(21) Appl. No.: 09/147,625

(22) PCT Filed: Jun. 2, 1998

(86) PCT No.: PCT/JP98/02429

§ 371 Date: Feb. 3, 1999

§ 102(e) Date: Feb. 3, 1999

(87) PCT Pub. No.: WO98/55412

PCT Pub. Date: Dec. 10, 1998

(30) Foreign Application Priority Data

Jun. 3, 1997 (JP) ................................................ 9-145398

(51) Int. Cl.[7] .................................................. C03B 23/025
(52) U.S. Cl. .................................. 65/107; 65/114; 65/253; 65/273; 65/287

(58) Field of Search ........................... 65/106, 107, 114, 65/253, 273, 287

(56) References Cited

U.S. PATENT DOCUMENTS

| | | |
|---|---|---|
| 4,226,608 | 10/1980 | McKelvey . |
| 4,311,509 | 1/1982 | Reader et al. . |
| 4,381,933 | 5/1983 | Schultz et al. . |
| 4,957,528 * | 9/1990 | Letemps et al. ........................ 65/104 |
| 4,966,618 * | 10/1990 | Letemps et al. ........................ 65/106 |
| 5,094,679 * | 3/1992 | Letemps et al. ........................ 65/289 |

FOREIGN PATENT DOCUMENTS 8-188431   7/1996   (JP) .

* cited by examiner

*Primary Examiner*—Sean Vincent
(74) *Attorney, Agent, or Firm*—Oblon, Spivak, McClelland, Maier & Neustadt, P.C.

(57) ABSTRACT

In a bending apparatus for glass sheets, at least some of distances between conveyor rolls are set so as to be unequal, forming glass sheets having good quality and free from optical distortion. For the purpose, the distances between conveyor rolls which are provided from an outlet of a heating furnace are set so as to be unequal and to gradually expand toward a downstream direction.

12 Claims, 7 Drawing Sheets

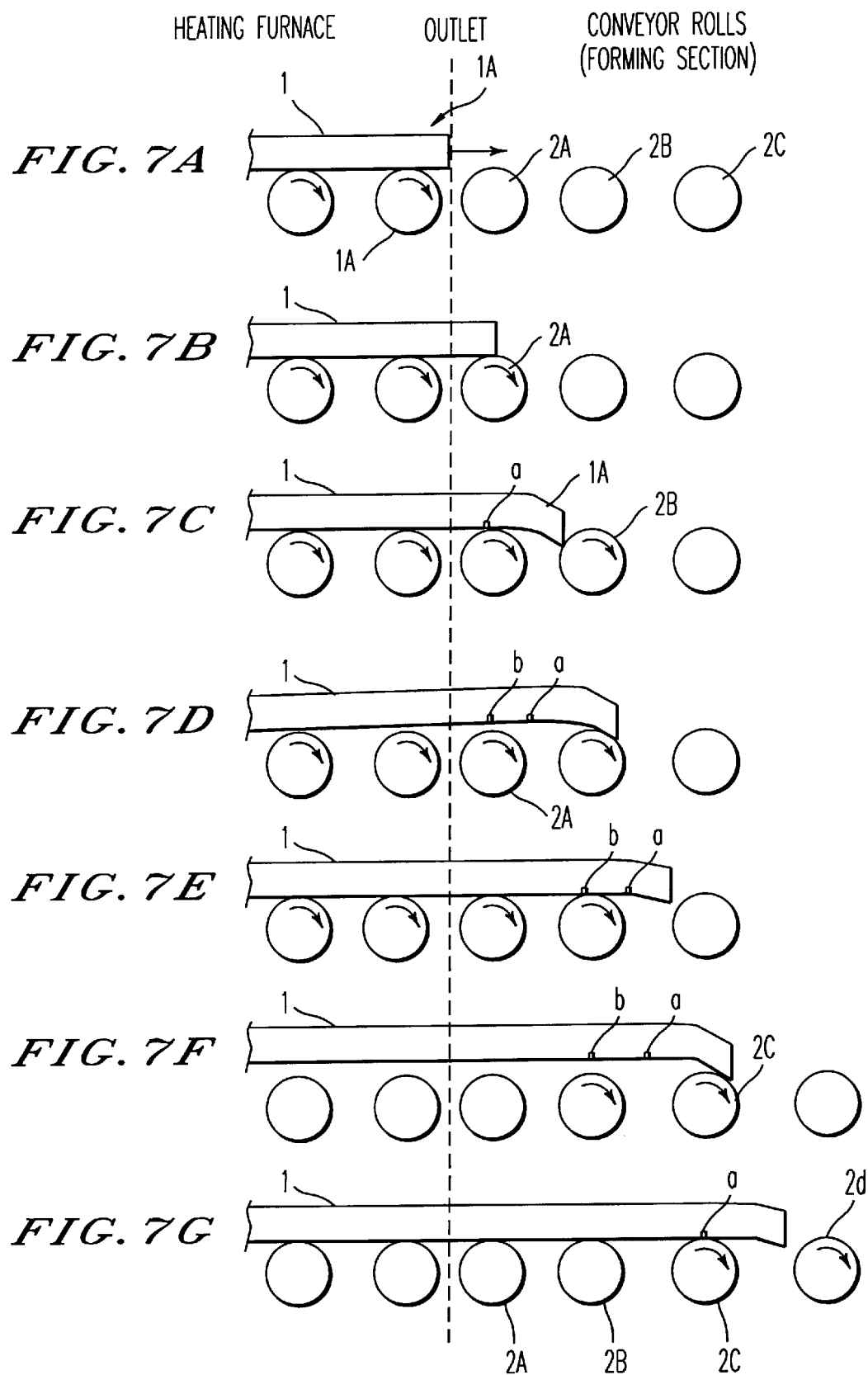

METHOD AND APPARATUS FOR BENDING SHEET GLASS

BACKGROUND OF THE INVENTION

1. Field of the Invention

The present invention relates to a bending method and a bending apparatus for glass sheets. In particular, the present invention relates to a bending method and a bending apparatus for glass sheets wherein glass sheets heated to a bending temperature by a heating furnace are conveyed and the glass sheets are bent in a shape along a conveyer path under their own weight.

2. Discussion of the Background

As an apparatus for bending glass sheets during conveyance by rolls, there have been known roll-formed conveyor apparatuses (for instance, U.S. Pat. No. 4,311,509). Such roll-formed conveyor apparatuses include a plurality of conveyer rolls which are bent so as to have arbitrary curvatures. The conveyor rolls are provided at equal distances. The conveyor rolls provide a conveyor path having arbitrary curvatures in the apparatuses. The glass sheets which are heated to a softening temperature in a heating furnace are conveyed on the conveyor path from an outlet of the heating furnace toward a certain direction. The glass sheets which are conveyed on the conveyor path are bent in a shape along the conveyor path under their own weight during conveyance.

However, the conventional conveyor rolls cause striped defects on a surface of the glass sheets after forming. The striped defects are optical distortion caused during bending the glass sheets, and the distortion degrades the quality of the glass sheets.

The causes of the optical distortion will be explained, referred to FIG. 7. FIG. 7 is a transitional view showing how a glass sheet 1 which has been delivered from an outlet of a heating furnace is conveyed by a plurality of conveyer rolls 2A, 2B, 2C, 2D forming a conveyor path. The glass sheet 1 is bent in a certain shape, being conveyed by the conveyor rolls 2A, 2B, 2C, 2D.

As shown in FIG. 7(B), when the glass sheet 1 has a leading portion 1A contacted with the conveyor roll 2A, the leading portion 1A has heat removed to the conveyor roll 2A. Such removal of heat causes a conveyor roll side of the glass sheet 1 to be thermally shrunk, making the leading portion 1A sag downwardly (C). As shown in (D), the sagged leading portion 1A runs onto the conveyor roll 2B when passing on the conveyor roll 2B. This creates a state that the entire glass sheet 1 is slightly lifted. As shown in (E), when the leading portion 1(A) has passed the conveyor roll 2B, the entire glass sheet 1 returns to a position before being lifted, and contacts with the conveyor rolls 2A, 2B. (F) and (G) are viewes showing a repeat of the operations in (D) and (E). As explained, the glass sheet 1 is conveyed on the conveyor rolls 1A, 2B, 2C, 2D . . . , being slightly vibrated in a vertical direction because of the presence of such sagging motion of the leading portion 1A.

In (C)–(G), attention is directed to arbitrary points a and b on the glass sheet 1 (actually, lines perpendicular to a conveyance direction). The point a rises (D) after contacting with the conveyor roll 2A, and contacts with the conveyor roll 2B after lowering of the glass sheet 1 (E). Next, the point a rises (F) and contacts with the conveyor roll 2C when having lowered (G). In other words, the glass sheet 1 sequentially contacts with the conveyor rolls 2A, 2B, 2C, 2D . . . , during conveyance.

On the other hand, the point b is located above the conveyor roll 2A as shown in (D) when the glass sheet 1 is lifted. After that, the point b is located between the conveyor roll 2A and the conveyor roll 2B in (E) wherein the glass sheet 1 has lowered. This motion prevents contact with the conveyor roll 2A. Repeats of such motion prevent contact with the conveyor rolls 2B, 2C, 2D as well. In other words, the point b does not contact with the conveyor roll 1A, 2B, 2C, 2D . . . at all during conveyance of the glass sheet 1.

When the conventional conveyor rolls are used, portions (e.g. the point a) which are cooled by contact with the conveyor rolls and portions (e.g. the point b) which are not cooled by the conveyor rolls not at all coexist on formed glass sheets. This creates differences among these portions in terms of thermal shrinkage, and the differences are exhibited as striped defects in the formed glass sheets. This is the causes of the optical distortion.

SUMMARY OF THE INVENTION

The present invention has been conceived, considering these problems, and it is an object of the present invention to provide a bending method and an bending apparatus for glass sheets capable of forming glass sheets having good quality and free from any optical distortion.

In order to attain the object, the present invention provides a method for bending glass sheets wherein glass sheets are conveyed in a heating furnace to be heated to a certain bending temperature, the heated glass sheets are conveyed on a conveyor path including a plurality of conveyor rolls provided from an outlet of the heating furnace toward a downstream direction and having certain curvatures given thereto by the rolls, and the glass sheets are bent in a shape along the conveyor path under their own weight, characterized in that the conveyor rolls are provided to set at least some of distances between adjoining conveyor rolls so as to be different from the other distances, and that the glass sheets are conveyed on the conveyor path.

The present invention also provides an apparatus for bending glass sheets which comprises a heating furnace to heat glass sheets to a bending temperature, a conveyor for conveying the glass sheets in the heating furnace, and a conveyor path including a plurality of conveyor rolls provided from an outlet of the heating furnace toward a downstream direction and having certain curvatures given by the rolls, wherein the heated glass sheets are conveyed on the conveyor path to be bent in a desired shape; characterized in that the conveyor rolls are provided to set at least some of distances between adjoining conveyor rolls so as to be different from the other distances.

As explained, the present invention is based on finding that the rout cause of the optical distortion stated earlier is the equality in the distances between the conveyor rolls, and the present invention sets some of the distances between the conveyor roll so as to be unequal in order to improve the optical distortion. When the distances between the conveyor rolls are equal, portions which are cooled by contact with the conveyor rolls and portions which are not cooled by the conveyor rolls at all coexist in formed glass sheets. This phenomenon causes optical distortion in the glass sheets. On the other hand, when at least some of the distances between the conveyor rolls are set to be unequal in accordance with the present invention, glass sheets can contact with the conveyor rolls at any portions thereof. This prevents striped defects from being caused in the glass sheets, improving the quality of the glass sheets.

BRIEF DESCRIPTION OF THE DRAWINGS

FIG. 7 is a transitional view wherein a glass sheets is conveyed by conventional conveyor rolls.

DETAILED DESCRIPTION OF THE PREFERRED EMBODIMENTS

Figure 1:
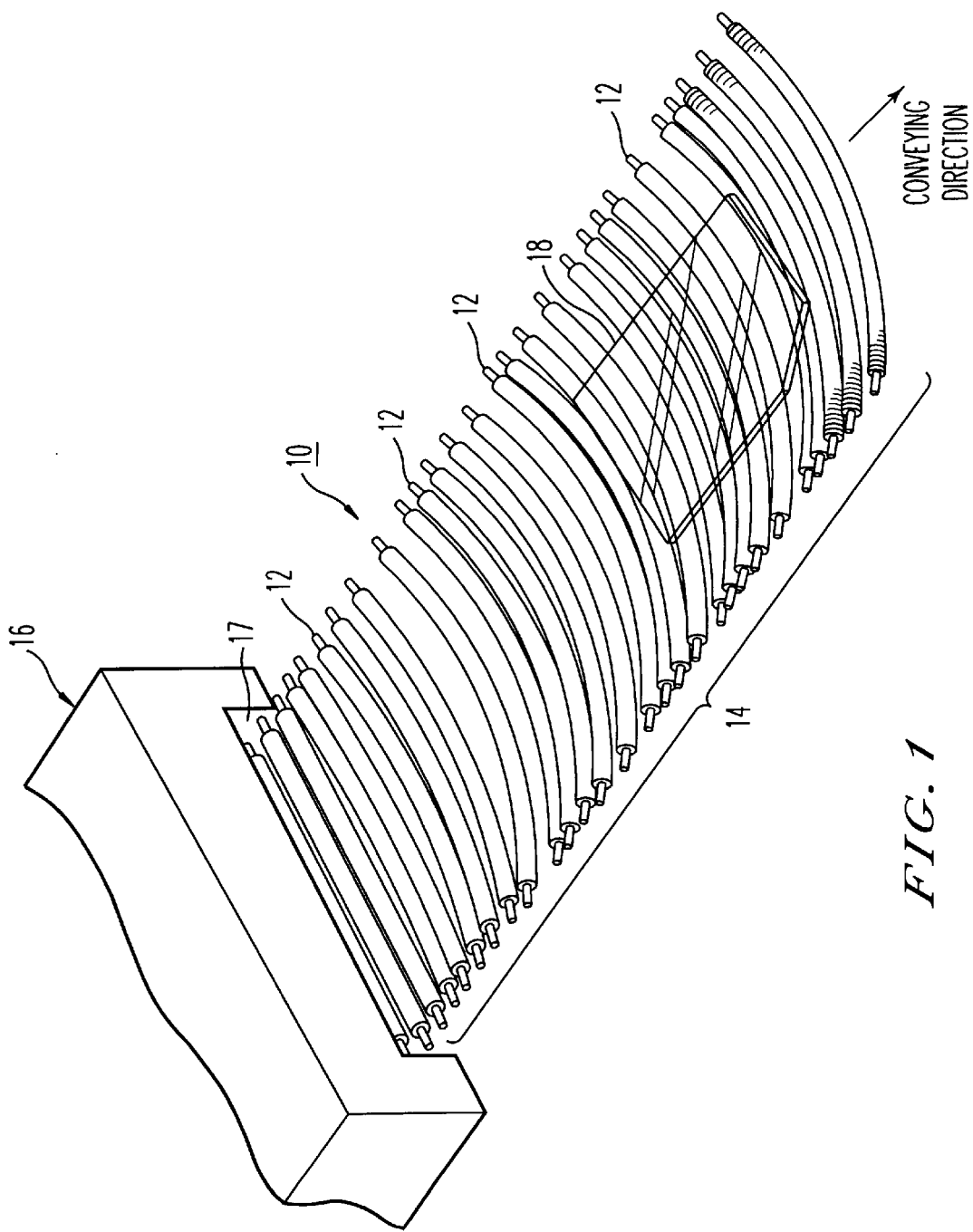
FIG. 1 is a perspective view showing the bending apparatus for glass sheets according to an embodiment of the present invention, and the bending method for glass sheets according to an embodiment using the bending apparatus.

Now, the bending apparatus for glass sheets according to a preferred embodiment of the present invention will be described in detail, referring to the accompanying drawings. In FIG. 1 is shown a perspective view of the bending apparatus for glass sheets according to the preferred embodiment of the present invention, and an embodiment of the bending method for glass sheets using the bending apparatus.

As shown in this figure, the bending apparatus for glass sheets 10 includes a plurality of conveyor rolls 12, 12 . . . . The conveyor rolls 12, 12 . . . are provided in parallel with one another to provide a conveyor path 14 defining a forming section. The conveyor path 14 formed by the conveyor rolls 12, 12 . . . is provided at an outlet of a heating furnace 16. In the heating furnace, glass sheets are conveyed by an adequate conveyor. As this conveyor, there are various type of measures. Since the conveyor rolls are provided from the outlet of the heating furnace toward a downstream direction, it is preferable that the conveyor in the heating furnace comprises a plurality of rolls.

The conveyor rolls 12 on an upstream side of the conveyor path 14 are formed in a linear shape, and the conveyor rolls on an downstream side of the conveyor path 14 are bent so as to have certain curvatures. The curvatures of the conveyor rolls 12 are determined so that the curvatures increase (radiuses of curvatures decrease) gradually from the upstream side toward the downstream side of the conveyer path 14 and chat a certain curvature is established on the downstream side of the conveyor path 14.

A glass sheet 18 is heated to a bending temperature (normally 650° C.–700° C.) in the heating furnace and is delivered onto the conveyor path 14. The heated glass sheet 18 is bent in a shape along the conveyor path 14 under its own weight while the glass sheet is conveyed on the conveyor path 14. The certain curvatures of the conveyor rolls are determined so as to correspond to a desired shape for glass sheets. In particular, glass sheets can have formed shape thereof slightly deformed by being cooled after bending. The certain curvatures of the conveyor rolls include curvatures that are determined, taking such deformation in the formed shape into account.

Figure 2:
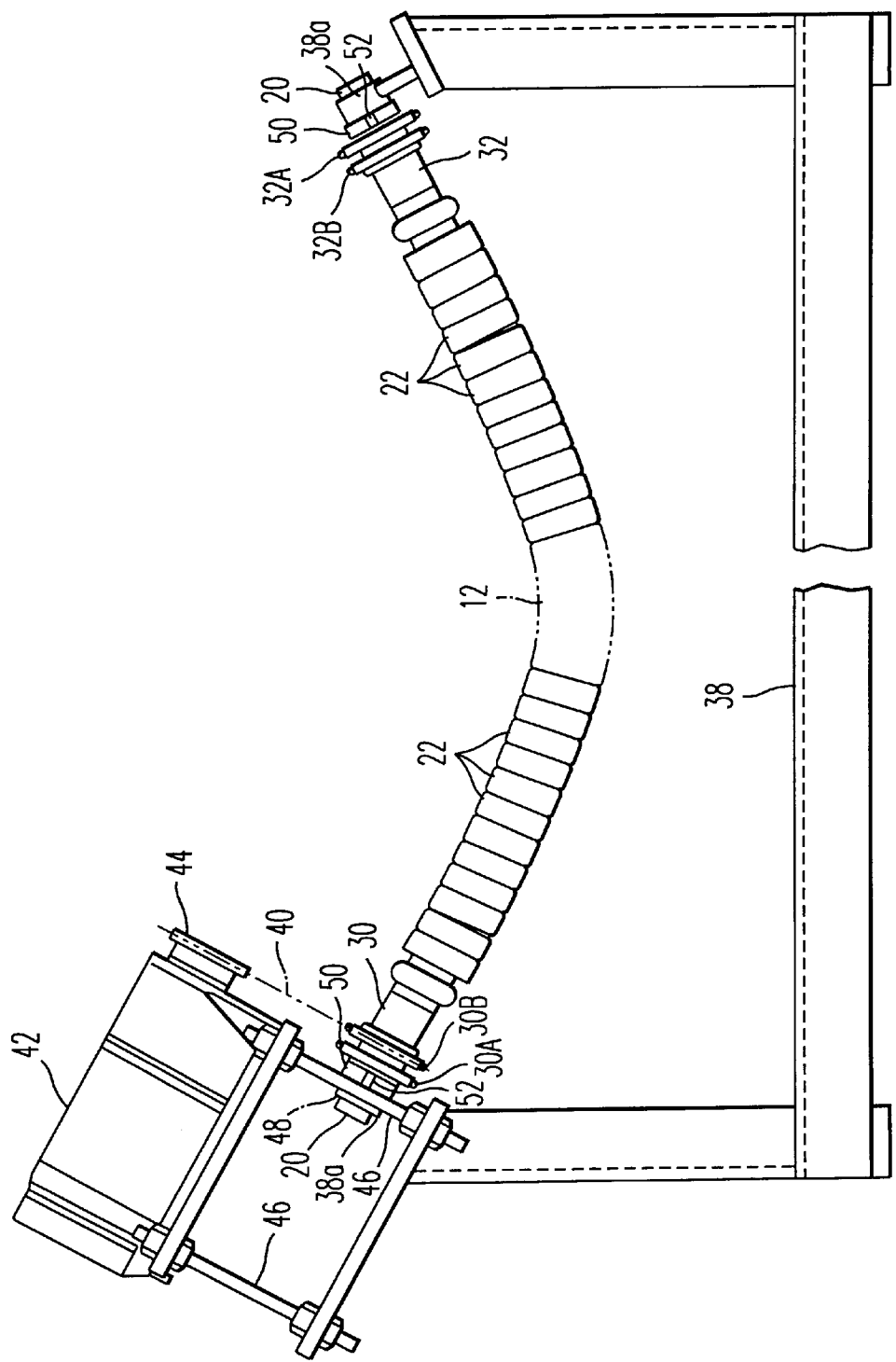
FIG. 2 is a front view showing an example of the arrangement of a conveyor roll in FIG. 1.

As shown in FIG. 2, each conveyor roll 12 comprises a guide shaft 20 and a plurality of ring rolls 22, 22 . . . carried on the guide shaft 20, and is mounted to a supporting frame 38. A lefthand sprocket housing 30 is provided at a left lateral end of the ring rolls 22, and a righthand sprocket housing 32 is provided at a right lateral end of the ring rolls. The supporting frame 38 has both ends provided with mounting members 38a, and both ends of the guide shaft 20 are fixed to the mounting members 38a, 38a.

At a left end of the lefthand sprocket housing 30 are provided first and second sprocket 30A, 30B. The second sprocket 30B is coupled to a sprocket 44 of a driving motor 42 through a chain 40 so as to receive a rotational force. The driving motor 42 is fixed to the supporting frame 38 through bolts 46, 46 . . . . A bushing 48 is fitted in between the lefthand sprocket housing 30 and the guide shaft 20. The guide shaft 20 has a stop ring 50 fitted in a portion thereof on a left end side of the lefthand sprocket housing 30, and the stop ring 50 is fixed to the guide shaft 20 through a bolt 52.

Like the lefthand sprocket housing 30, the righthand sprocket housing 32 is fixed to an right end portion of the guide shaft 20. The righthand sprocket housing 32 is provided with first and second sprockets 32A, 32B like the lefthand sprocket housing 30. Explanation of the first and second sprockets 32A, 32B will be omitted since these sprockets are the same as the first and second sprockets 30A, 30B of the lefthand sprocket housing 30. The guide shaft 20 also has a stop ring 50 fitted in a portion thereof on a right end side of the righthand sprocket housing 32, and the stop ring 50 is fixed to the guide shaft 20 through a bolt 52. By such arrangement, both ends of the guide shaft 20 are fixed by the stop rings 50, and the ring rolls 22, 22 are held with upper ends thereof contacted one another between the lefthand sprocket housing 30 and the righthand sprocket housing 32.

The driving motor 42 is not required to be provided at every conveyor roll. When the sprockets (30A, 32A) of adjoining conveyor rolls are coupled, the rotational motion of a conveyor roll with the drive motor 42 provided can be transmitted to its adjoining conveyor roll. The rotational motion by the driving motor can be transmitted to a conveyor roll next to the adjoining conveyor roll.

Figure 3:
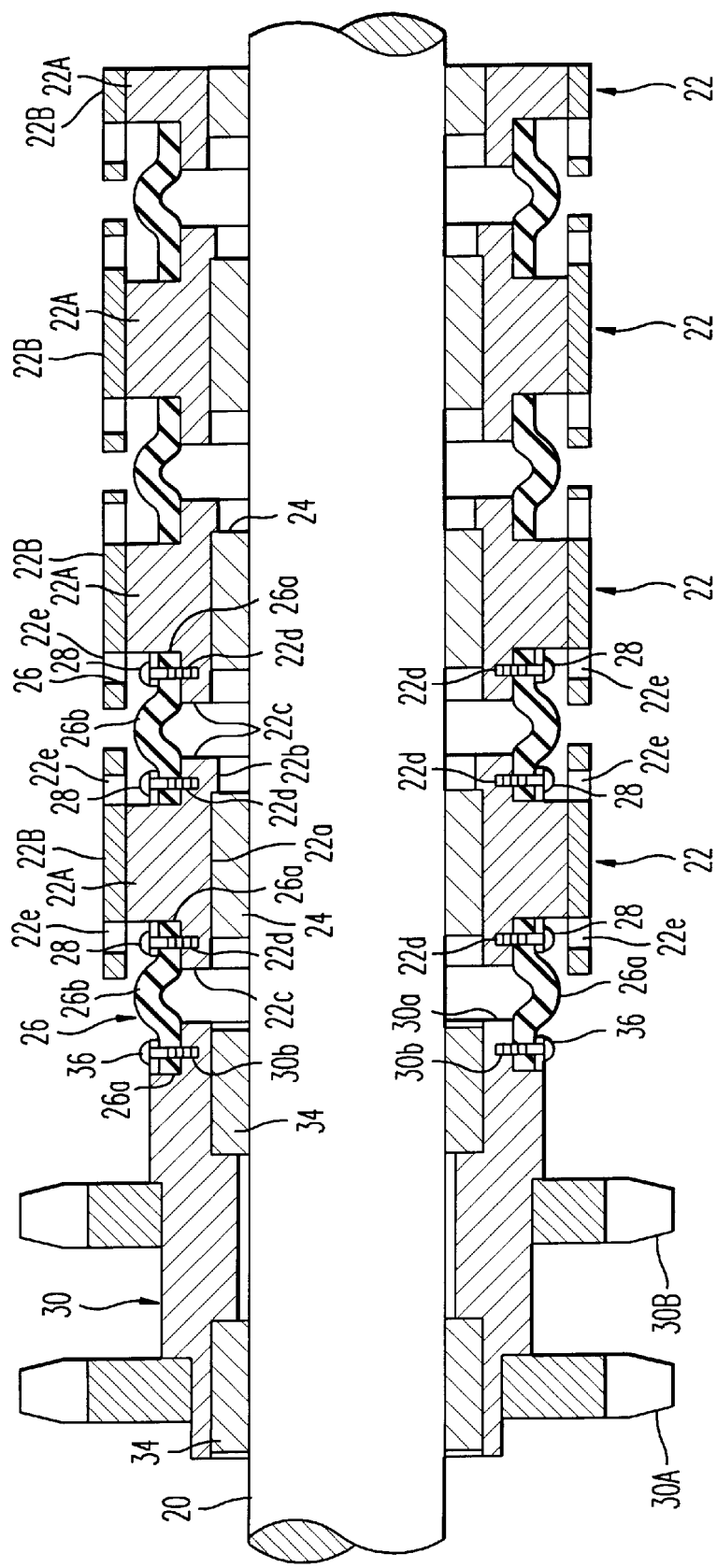
FIG. 3 is a partially enlarged sectional view showing an example of a conveyor roll in FIG. 2.

The structure of the conveyor rolls will be described in detail, using FIG. 3. In each of the conveyor rolls 12, the ring rolls 22, 22 . . . are rotatably supported on the guide shaft 20. The ring rolls 22 comprise a roll body 22A and a collar 22B. The roll body 22A is formed in a cylindrical shape and has a central portion formed with a great diameter of through hole 22a opening at one end surface thereof and a small diameter of through hole 22b opening at the other end surface. The small diameter of through hole 22b has a hole diameter greater than the outer diameter of the guide shaft 20. The greater diameter of through hole 22a has a bushing 24 fitted thereinto, and the bushing 24 is fitted on the guide shaft 20. By such arrangement, the ring rolls 22 are carried on the guide shaft 20 so as to be rotatable.

Each roll body 22A has both end surfaces formed with annular ribs 22c, 22c, and screwed holes 22d, 22d are formed at two locations of an outer peripheral surface of each of the ribs. Each collar 22B is fitted onto an outer periphery of each roll body 22A by shrinkage fit for instance. Each collar 22B has substantially the same width as the entire width of each of roll body 22A, and each collar has holes 22e formed therein in alignment with the screwed holes 22d in a related roll body 22A.

Adjoining ring rolls 22, 22 are coupled together by a flexible cylindrical member 26 which is provided on the annular ribs 22c, 22c of the adjoining ring rolls and is made of rubber. Each flexible cylindrical member 26 has both ends formed with screw through holes 26a. Screws 28 (replaceable by tighting members such as machine screws and clips) are inserted into the screw through holes 26a to be engaged with the screwed holes 22b in the related ribs 22c, coupling the adjoining ring rolls 22, 22 together. Each flexible cylindrical member 26 has an outwardly projecting portion 26b formed therein throughout the entire circumference at a central portion in a width direction thereof.

Each sprocket housing 30 and its adjoining ring roll 22 are coupled through a flexible cylindrical member 26 by such arrangement, the torque transmitted to each sprocket 30B can be transmitted to adjoining ring rolls 22, 22 . . . one by one through the flexible cylindrical members 26, providing each conveyor roll 20 with a rotational force required for conveying glass sheets.

Figure 4:
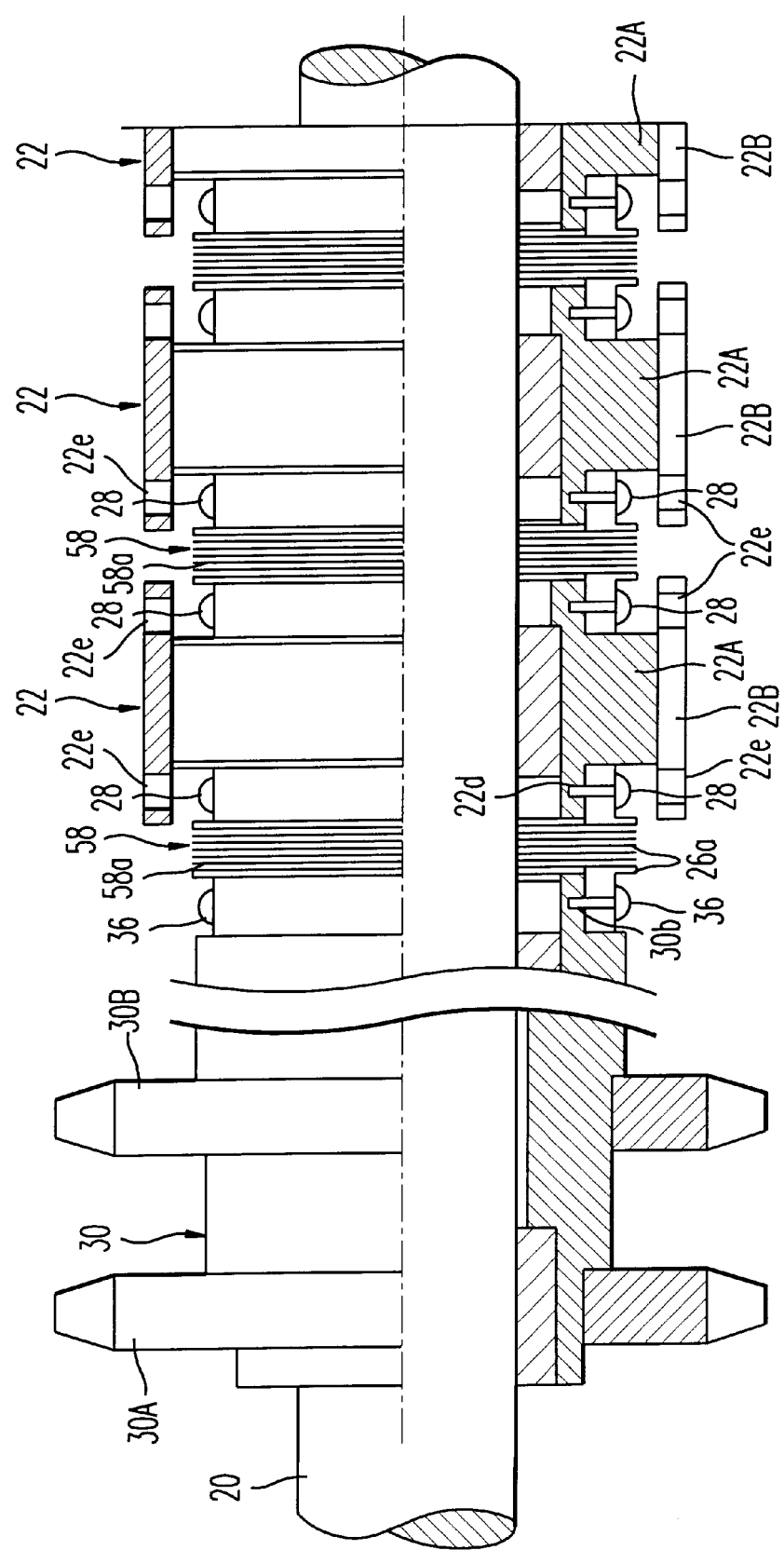
FIG. 4 is a partially enlarged sectional view showing another example of a conveyor roll in FIG. 2.

In FIG. 4 is shown another example of the structure of the conveyor rolls. In this example, adjoining ring rolls 22 are coupled by a rigid cylindrical member 58 which is interposed therebetween and is formed in a bellows shape. The rigid cylindrical member 58 in a bellows shape is made of a material having high toughness such as spring steel, and has an expanding and contracting portion 58a formed in an intermediate portion thereof in a width direction thereof. Both ends of the rigid cylindrical member 58 are mounted to the annular ribs 22c, 22c of the adjoining ring rolls 22, 22, and both ends of the rigid cylindrical member 58 are fixed to the annular ribs 22c, 22c by screws 28. Coupling the lefthand sprocket housing 30 with its adjoining ring roll 22 and coupling the righthand sprocket housing 32 with its adjoining ring roll 22 are made by similar rigid cylindrical members 58, and the coupling is established by screws 28, 36 as in the first example of the conveyor rolls.

In the second example, variations in the distance between adjoining ring rolls 22, 22 caused by the vibration of the adjoining ring rolls 22, 22 can be absorbed by the expanding and contracting portion 58a in a bellows shape of the rigid cylindrical member 58.

When one of the ring rolls 22 in a conveyor roll 12 is replaced by a new one in this example, a screw driver is inserted from the holes 22e in the relevant collar 22B, the screws 28 in the ring roll 22 to be replaced are loosed by the driver to remove the relevant flexible cylindrical members 26b from the annular ribs 22c of the ring roll, the ring roll is replaced by the new ring roll 22, and the flexible cylindrical members 26b are tightened to the new ring roll 22 by the screws 28.

Since each guide shaft is bent, adjoining ring rolls are required that vibration of each ring roll be easy and that the adjoining ring rolls be coupled so as to ensure the transmission of torque. Cylindrical members are suitable for coupling the ring rolls since such members are difficult to be deformed with respect to a force in a torsional direction and relatively easy to be deformed with respect to in a bending direction. From this viewpoint, it is preferable that adjoining ring rolls are coupled by the flexible cylindrical member 26 shown in FIG. 3 or the rigid cylindrical member 58 shown in FIG. 4.

The flexible cylindrical member 26 is required to have a thick wall in order to ensure the transmission of torque between the ring rolls. However, there is a possibility that such a thick wall degrades of the oscillating property of ring rolls. The formation of the annular outwardly projecting portion in a central portion of the cylindrical member in the width direction can bend the cylindrical member easy even if the cylindrical member has a thick wall. Since the annular outwardly projecting portion has deformation loads repeatedly applied thereto in comparison with other portions of the cylindrical member, it is preferable that the wall of the annular outwardly projecting portion is thicker than that of the other portions.

Although the transmission of torque between the ring rolls is ensured by the rigid cylindrical member 58 as a rigid member, there is a possibility that the oscillating property of the ring rolls may be degraded if no measures is adopted. The cylindrical member can be bent easily by providing the cylindrical member with a bellows shape. The number of folds of the bellows shape is determined to satisfy the requirements stated above, considering the material, the wall thickness and so on of the cylindrical member.

Figure 5:
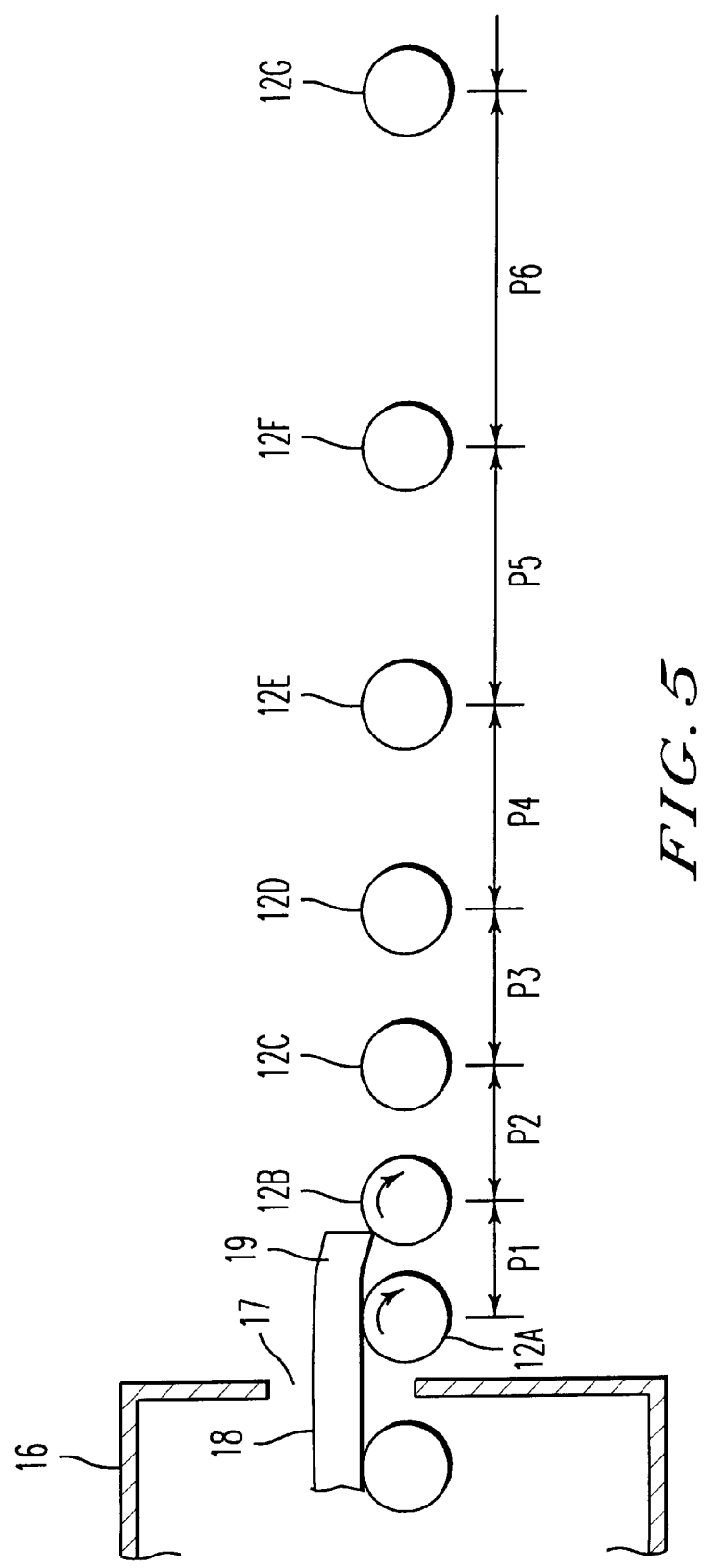
FIG. 5 is a schematic view to explain distances between the conveyor rolls in FIG. 1.

As shown in FIG. 1, the conveyor rolls 12, 12 . . . according to this embodiment are provided so that the distances between adjoining conveyor rolls are unequal. The present invention is constructed with several conveyor rolls, for example at least three or at least four conveyor rolls, of the conveyor path being spaced apart by unequal distances. The distances means horizontal distances between central rotational shafts of adjoining conveyor rolls as shown in FIG. 5. The unequal distances shown in FIG. 1 will be explained in detail, referring to FIG. 5. Seven conveyor rolls 12A–12G which are provided from the outlet 17 of the heating furnace 16 in that order are set so that distances (P1–P6) between the respective conveyor rolls are different. The distances are set so as to gradually expand toward the downstream side (P1<P2<P3<P4<P5<P6). In the shown example, P1 is equal to 60 mm, and P2, P3, P4, P5 and P6 gradually increase by 4 mm, respectively.

The distances (P1–P3) of the conveyor rolls 12A–12D which are located in the vicinity of the outlet 17 of the heating furnace 16 are set so as to minimize the amount of sagging of She leading portion 19 of the glass sheet 18. The distances between the eighth and its subsequent conveyor rolls 12, 12 . . . are set to repeat the distances of P1–P6 or to be unequal one another. The unequality may include a case wherein all distances are unequal and a case wherein some of the distances are unequal. A small number of unequal distances may result in insufficient contribution to a decrease in the optical distortion. In order to cope with this problem, it is preferable that a certain number of distances are unequal one another. In particular, it is preferable that the distances are gradually changed as in the shown example since the provision of the conveyor rolls can be effectively carried out and the gradual changes can remarkably contribute to a decrease in the optical distortion.

Now, the operation of the conveyor rolls 12 according to this embodiment will be described, referring to FIG. 6. In FIG. 6 is shown a transitional view showing how the glass sheet 18 which has been delivered from the outlet 17 of the heating furnace 16 is conveyed by the plural conveyor rolls 12A–12E . . . . The glass sheet 18 is bent into a certain shape, being conveyed on the conveyor rolls 12A–12E . . . .

Figure 6A:
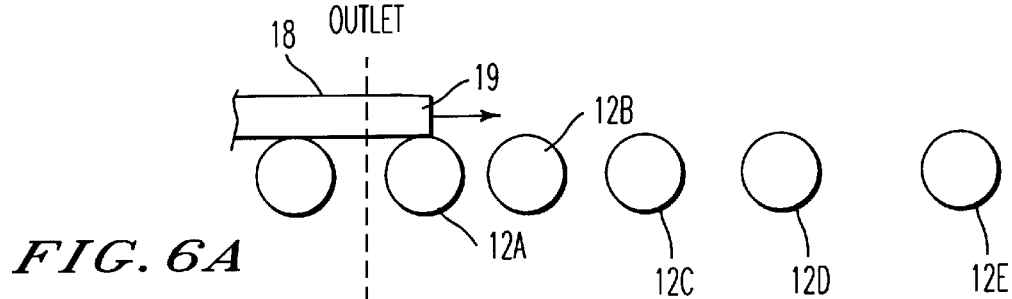
FIG. 6 is a transitional view wherein a glass sheet is conveyed by the conveyor rolls in FIG. 1.
Figure 6B:
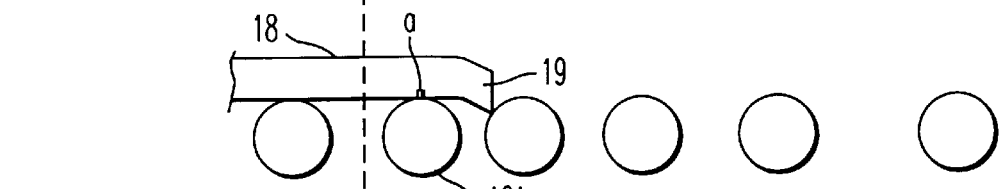
Figure 6C:
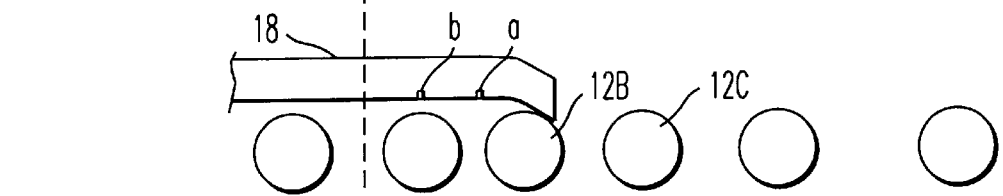
Figure 6D:
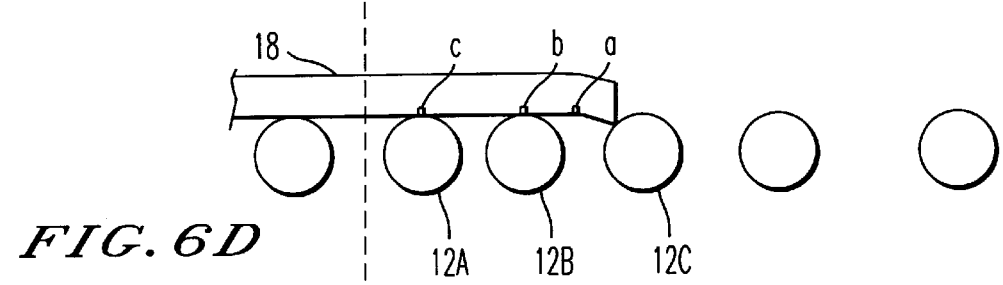
Figure 6E:
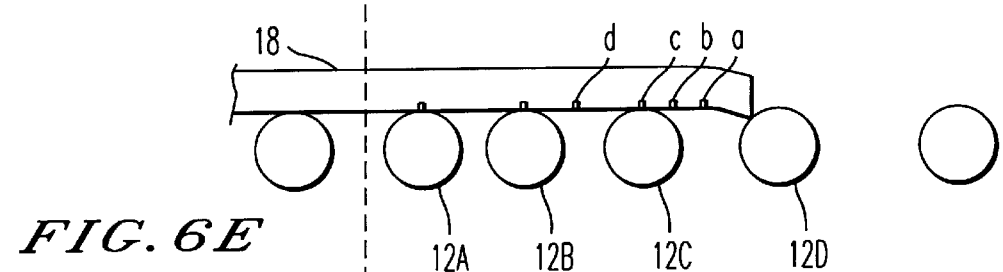
Figure 6F:
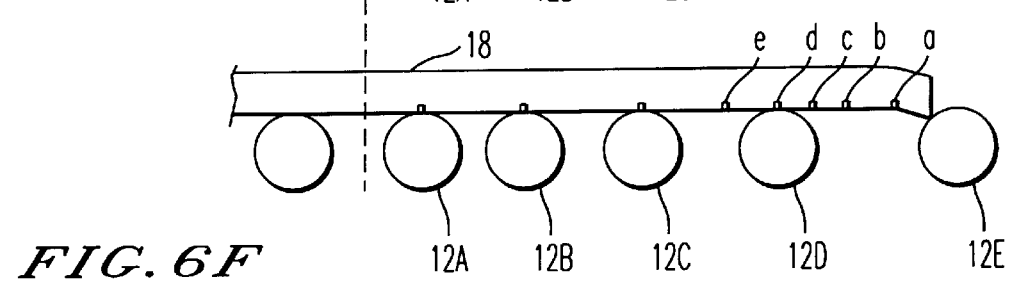

As shown in FIG. 6(A), when the glass sheet 18 has the leading portion 19 contacted with the conveyor roll 12A, the leading portion 19 is cooled by being removed heat by the conveyor roll 12A. As a result, the glass sheet 18 sags downwardly by heat shrinkage (B). As shown in (C), the sagged leading portion 19 runs onto the conveyor roll 12B when passing the conveyor roll 12B. This creates a state that the entire glass sheet 18 is slightly lifted. As shown in (D), when the leading portion 19 has passed the conveyor roll 12B, the entire glass sheet 18 returns to the position before being lifted, and the glass sheet 18 contacts with the conveyor rolls 12A, 12B. (E) and (F) are viewes showing a repeat of the operations in (C) and (D). As explained, the glass sheet 18 is conveyed on the conveyor rolls 12A–12E . . . , being slightly vibrated in a vertical direction because of the presence of such sagging motion of the leading portion 19.

Attention is directed to arbitrary points a, b, c, d and e on the glass sheet 18 (actually, lines perpendicular to the conveyance direction) in (B)–(F). The point a rises (C) after having contacted with the conveyor roll 12A (B). When the glass sheet 18 has lowered (D), the point a goes beyond the conveyor roll 12B and is present between the conveyor roll 12B and the conveyor roll 12C. When the glass sheet 18 lowers after the point b has been present above the conveyor roll 12A (C), the point b contacts with the conveyor roll 12B (D). The point c is present between the conveyor roll 12B and the conveyor roll 12C (E) after having contacted with the conveyor roll 12A (D). The point d which has not contacted with the conveyor roll 12A or the conveyor roll 12B contacts with the conveyor roll 12C when the glass sheet occupies a position shown in (E). On the other hand, the point e which has not contacted with any one of the conveyor rolls 12A–12C contacts with the conveyor roll 12D when the glass sheet occupies a position shown in (F).

As explained, the mode according to the present invention allows any positions on the glass sheet 18 to contact with at least one conveyor roll 12 since the distances between the conveyor rolls 12A–12E . . . are set so as to be unequal. As a result, the optical distortion that occurs in the glass sheet 18 can be dispersed to prevent striped defects from causing in the glass sheet 18, providing the glass sheet 18 with good quality.

According to this mode, the glass sheet 18 can be smoothly conveyed since the amount of sagging of the leading portion 19 is minimized by adopting such arrangement wherein the distances (P1–P3) between the conveyor rolls 12A–12D in the vicinity of the outlet 17 of the heating furnace 16 are narrow. The distances between conveyor rolls in the vicinity of the outlet of the heating furnace may be conversely extended.

When a glass sheet which has been delivered from the outlet of the heating furnace contacts with conveyor rolls in the most upstream side, the conveyor rolls remove heat from the glass sheet to cool the glass sheet, causing the glass sheet to sag. If the distances between conveyor rolls in the vicinity of the outlet of the heating furnace are wide, the amount of sagging of the leading portion increases and the leading portion enters spacing between the conveyor rolls, causing conveyance trouble, in some cases. The amount of sagging of the leading portion can be minimized by adopting such arrangement that the distances between conveyor rolls in the vicinity of the outlet of the heating furnace are narrow. By such arrangement, a glass sheet can be smoothly conveyed to reduce the optical distortion due to conveyance trouble. From this viewpoint, it is preferable that the distances between conveyor rolls provided in the vicinity of the outlet of the heating furnace are set to be narrower than the distances between the subsequent conveyor rolls.

The distances (P1–P6) of the conveyor rolls 12 may be adequately set, depending on the conveyance speed of the glass sheet 18 or the diameter of the conveyor rolls 12. Specific methods to consider the conveyor speed and the diameter will be explained later on.

Glass sheets have been heated in the heating furnace 16 are normally tempered by quenching after the glass sheets have been bent on the conveyance path 14. If the temperature of the glass sheets lowers too much, the tempering treatment can not be carried out in sufficient fashion. It is necessary to make a drop in the temperature of the glass sheets on the conveyance path 14 as small as possible.

In principle, it is possible to prevent the glass sheets from being cooled to a temperature lower than the temperature required for the tempering treatment by increasing the conveyance speed of the glass sheets. On the other hand, if the conveyance speed of the glass sheets increases too much, the glass sheets jar during conveyance, causing conveyance trouble. From this viewpoint, it is preferable that the conveyance speed of the glass sheets is in a range from 400 mm/sec to 600 mm/sec. Under the circumferences, it is preferable that the entire length of the conveyor path in the conveyance direction is in a range from 1,300 mm to 2,000 mm, considering a drop in the temperature of the glass sheets during conveyance and a temperature capable of bending the glass sheets.

It is preferable that the conveyor path 14 has a width in a direction perpendicular to the conveyance direction in a range from 800 mm to 1,200 mm. A width in such range can cope with variety of dimensions of glass sheets when glass sheets for e.g. automobile side-lights are bent (normally the glass sheets are bent in a width direction perpendicular to the conveyance direction). Glass sheets for most automobile side-light have a width in a direction perpendicular to the conveyance direction extending from around 300 mm to around 600 mm. The fact that the width of the conveyor path 14 in the direction perpendicular to the conveyance direction is in the range from 800 mm to 12,000 mm means that the conveyor rolls 12 per se have a length from around 800 mm to around 12,000 mm (it is not considered that the conveyor rolls are bent). In order to provide a certain mount of rigidity to the conveyor rolls having a length from around 800 to around 12,000 mm, it is preferable that the conveyor rolls 12 have a diameter in a range from 40 mm to 100 mm.

If the distances between the conveyor rolls are too great, glass sheets sag into spacing between the conveyor rolls during conveyance. From this viewpoint, the upper limit of the distances are in a range from 80 mm to 120 mm. When the distances are gradually increased toward the downstream direction as stated earlier, the distances are returned to the distances in the vicinity of the outlet of the heating furnace at a location with the maximum distance, and the subsequent distances are gradually increased toward the downstream direction again (such arrangement is repeated when necessary).

Before glass sheets completely accommodate to bent profiles of the conveyor rolls 12, the glass sheets have lateral edges extending in the conveyance direction supported by the conveyor rolls 12 (there is a gap between a central region of the glass sheets and the conveyor rolls). Thus, the glass sheets have the central region sagged downwardly, providing a bent shape to the glass sheets.

In order to smoothly convey the glass sheets, it is required that the glass sheets have the supported portions thereof located at an almost constant level in a vertical direction. When the glass sheets have the supported portion maintained at such constant level, the bent conveyor rolls have end portions thereof positioned above and central portion thereof positioned under the glass sheets. Since the respective conveyor rolls have different curvatures, the respective conveyor rolls have the end portions positioned at different level. Since the curvatures of the conveyor rolls gradually increase toward the conveyance direction, the levels of the end portions of the conveyor rolls gradually rise toward the conveyance direction. From this viewpoint, it is preferable that sprockets of the respective conveyor rolls are coupled by chains as measures to provide the respective conveyor rolls with rotational movement. Although the levels of the end portions of the conveyor rolls gradually increase toward the conveyance direction, the differences between the levels can be absorbed by the chain to smoothly transmit the rotary movement.

In order to modify the respective distances between the conveyor rolls in a case with the chain used as stated earlier, it is simple to remove elements of the chain. Such procedure can decrease the distances by a length corresponding to chain elements between adjoining conveyor rolls (¼ of the length of a chain element). Since the chain per se are required to have a certain degree of rigidity to provide the conveyor rolls with the rotational movement, the chain elements are also required to have a preferable size. From this viewpoint, it is preferable that the distances are modified by a shortest length in a range form 2 mm to 10 mm. Consideration is directed to the entire length of the conveyor path of 1,300 mm to 2,000 mm as well as the preferable diameter range of the conveyor rolls and the preferable upper limit of the distances between the conveyor rolls. According this consideration, it is preferable that the conveyor rolls are provided at different distances though distances having the same length are present at 2 to 10 locations, in particular, 2 to 5 locations in the conveyor path. When the distances are provided so that arrangements with gradually increased distances are repeated from the outlet of the heating furnace, it is preferable that the repeated arrangements are provided at 2 to 10 locations, in particular 2 to 5 locations.

As explained, in accordance with the bending method and the bending apparatus for glass sheets of the present invention, at least some of distances between the plural conveyor rolls can be set so as to be unequal, forming glass sheets having good quality and free from optical distortion.

What is claimed is:

1. A method for bending glass sheets comprising the steps of:
    heating a glass sheet in a heating furnace a certain bending temperature; and
    bending the heated glass sheet on a conveyer path including a plurality of conveyor rolls provided from an outlet of the heating furnace toward a downstream direction and having certain curvatures, wherein the glass sheet is bent under the weight of the glass sheet as the glass sheet is conveyed along the conveyor path, and wherein at least three of the plurality of conveyor rolls within a forming section of the conveyor path are spaced apart by unequal distances.

2. A method for bending glass sheets according to claim 1, wherein the unequal distances are different from distances between adjoining conveyor rolls, whereby the glass sheet is bent with every contact point between the glass sheet and the conveyor rolls during conveyance being different.

3. A method for bending glass sheets according to claim 1 wherein the conveyor path has a length in a conveyance direction set in a range from 1400 mm to 2000 mm.

4. A method for bending glass sheets according to claim 1, wherein conveyor rolls having a diameter in a range from 40 mm to 100 mm are used as the plurality of conveyor rolls.

5. A method for bending glass sheets according to claim 1, wherein the plurality of conveyor rolls are spaced apart by a first shortest distance and a second shortest distance having a difference in a range from 2 mm to 10 mm.

6. A method for bending glass sheets according to claim 1, wherein a distance between adjoining conveyor rolls near to the outlet of the heating furnace is set so as to be narrower than a distance between subsequent adjoining conveyor rolls.

7. An apparatus for bending glass sheets comprising:
    a heating furnace configured to heat glass sheets to a bending temperature;
    a conveyor configured to convey the glass sheets in the heating furnace; and
    a conveyer path including a plurality of conveyor rolls provided from an outlet of the heating furnace toward a downstream direction and having certain curvatures, wherein the heated glass sheets are conveyed on the conveyor path to be bent in a desired shape, and wherein at least four of the plurality of conveyor rolls of the conveyor path are spaced apart by unequal distances.

8. An apparatus according to claim 7 wherein the conveyor path has a length in a conveying direction extending in a range from 1400 mm to 2000 mm.

9. An apparatus for bending glass sheets according to claim 7, wherein conveyor rolls having a diameter in a range from 40 mm to 100 mm are used as the plurality of conveyor rolls.

10. An apparatus for bending glass sheets according to claim 7, wherein a first shortest distance and the second shortest distance among the distances between the plurality of conveyor rolls has difference in a range from 2 mm to 10 mm.

11. An apparatus for bending glass sheets according to claim 7, wherein a distance between adjoining conveyor rolls near to the outlet of the heating furnace is set so as to be narrower than a distance between subsequent adjoining conveyor rolls.

12. An apparatus for bending glass sheets according to claim 11, wherein the plurality of conveyor rolls are provided such that distances between adjoining conveyor rolls are gradually increased toward a downstream direction in a conveyance direction, and the distances have a maximum value in a range from 80 mm to 120 mm, and that the plurality of conveyor rolls are provided such that the distances are returned to a value of the distance between the conveyor rolls near to the outlet of the heating furnace at a position where the distances are gradually increased to become the maximum value, and the distances are gradually increased toward the downstream direction in the conveyance direction again.

* * * * *